(12) United States Patent
Wang et al.

(10) Patent No.: US 11,209,268 B2
(45) Date of Patent: Dec. 28, 2021

(54) DEPTH MEASURING METHOD AND SYSTEM

(71) Applicant: HANGZHOU HIKVISION DIGITAL TECHNOLOGY CO., LTD., Zhejiang (CN)

(72) Inventors: Jingxiong Wang, Zhejiang (CN); Hui Mao, Zhejiang (CN); Shiliang Pu, Zhejiang (CN)

(73) Assignee: HANGZHOU HIKVISION DIGITAL TECHNOLOGY CO., LTD., Zhejiang (CN)

( * ) Notice: Subject to any disclaimer, the term of this patent is extended or adjusted under 35 U.S.C. 154(b) by 266 days.

(21) Appl. No.: 16/345,418

(22) PCT Filed: Oct. 26, 2017

(86) PCT No.: PCT/CN2017/107850
§ 371 (c)(1),
(2) Date: Apr. 26, 2019

(87) PCT Pub. No.: WO2018/077218
PCT Pub. Date: May 3, 2018

(65) Prior Publication Data
US 2019/0265029 A1    Aug. 29, 2019

(30) Foreign Application Priority Data
Oct. 31, 2016    (CN) .......................... 201610928328.9

(51) Int. Cl.
G01C 3/04    (2006.01)
G06T 7/73    (2017.01)
(Continued)

(52) U.S. Cl.
CPC .............. *G01C 3/04* (2013.01); *G01B 11/26* (2013.01); *G01C 3/00* (2013.01); *G01C 3/085* (2013.01);
(Continued)

(58) Field of Classification Search
CPC ........... H04N 5/232123; H04N 13/239; H04N 13/296; H04N 5/23212; H04N 5/232125;
(Continued)

(56) References Cited

U.S. PATENT DOCUMENTS

2010/0265490 A1    10/2010    Watanabe
2012/0162388 A1*   6/2012     Sato ................ H04N 5/232123
                                                              348/49
2019/0017819 A1*   1/2019     Ohara ................ H04N 5/23296

FOREIGN PATENT DOCUMENTS

CN    101404757    4/2009
CN    101969548    2/2011
(Continued)

OTHER PUBLICATIONS

International Search Report (English) and Written Opinion dated Jan. 24, 2018, from International Application No. PCT/CN2017/107850, 9 pages.
(Continued)

*Primary Examiner* — Luke D Ratcliffe
(74) *Attorney, Agent, or Firm* — Meunier Carlin & Curfman LLC

(57) ABSTRACT

A depth measuring method and system applicable to a first binocular camera having a zoom lens is provided. The method includes: obtaining a current depth of a target object (S101); determining a focus with which the current depth is measured as a current focus (S102); determining, according to the preset correspondence between depth ranges and focuses, a current reference focus corresponding to a current (Continued)

reference depth range; wherein, the current reference depth range is a depth range in which the current depth falls (S103); determining whether the current focus is the same as the current reference focus; (S104); if the current focus is the same as the current reference focus, determining the current depth as the target depth of the target object (S105); or if the current focus is not the same as the current reference focus, adjusting the current focus to the current reference focus, measuring a current depth of the target object with the adjusted current focus (S106), and proceeding to the operation (S103) of determining, according to preset correspondence between depth ranges and focuses, a current reference focus corresponding to a current reference depth range. An object in various depth ranges is measured with a varying focus. The accuracy of the depth measurement of the target object is thus improved.

15 Claims, 5 Drawing Sheets

(51) Int. Cl.
| | | |
|---|---|---|
| G06T 7/521 | (2017.01) | |
| G06T 7/571 | (2017.01) | |
| H04N 5/232 | (2006.01) | |
| G01B 11/26 | (2006.01) | |
| G01C 3/32 | (2006.01) | |
| G01C 11/14 | (2006.01) | |
| G01C 3/14 | (2006.01) | |
| G01C 11/06 | (2006.01) | |
| G01C 3/00 | (2006.01) | |
| G01C 3/08 | (2006.01) | |

(52) U.S. Cl.
CPC ................ *G01C 3/14* (2013.01); *G01C 3/32* (2013.01); *G01C 11/06* (2013.01); *G01C 11/14* (2013.01); *G06T 7/521* (2017.01); *G06T 7/571* (2017.01); *G06T 7/74* (2017.01); *H04N 5/23238* (2013.01); *H04N 5/232125* (2018.08); *G06T 2207/10028* (2013.01)

(58) Field of Classification Search
CPC .... H04N 5/23238; G03B 35/08; G03B 13/36; G02B 2027/0132; G01C 3/04; G01C 3/32; G01C 11/14; G06T 7/74; G06T 7/521; G06T 7/571; G06T 2207/10028; G01B 11/26
See application file for complete search history.

(56) References Cited

FOREIGN PATENT DOCUMENTS

| CN | 103292779 | 9/2013 |
|---|---|---|
| CN | 103776419 | 5/2014 |
| CN | 104880154 | 9/2015 |
| CN | 104883560 | 9/2015 |
| CN | 105423954 | 3/2016 |
| WO | 2017145945 | 8/2017 |

OTHER PUBLICATIONS

Jie, X. et al. "Distance Measurement Using Binocular-Camera with Adaptive Focusing", Journal of Shanghai University (Natural Science), vol. 15, No. 2, Apr. 2009 (English Abstract).
Zhang, Z. et al. "Adaptive Zoom Distance Measuring System of Camera Based on the Ranging of Binocular Vision", Modern Applied Science, vol. 6, No. 5, May 2012.
Extended European Search Report issued in corresponding EP Patent Application No. 17865985.0, dated Oct. 11, 2019; 9 pages.

* cited by examiner

DEPTH MEASURING METHOD AND SYSTEM

The present application claims the priority to a Chinese patent application No. 201610928328.9 filed with China National Intellectual Property Administration on Oct. 31, 2016 and entitled "depth measuring method and system", which is incorporated herein by reference in its entirety.

TECHNICAL FIELD

The present application relates to the field of video surveillance technology, and in particular to a depth measuring method and system.

BACKGROUND

At present, image processing technology has been widely used in people's daily life. For example, the depth of a target object can be measured through processing on acquired images. The depth of object refers to a vertical distance between the object and a plane in which the lens of an image acquisition device is disposed.

As a person's eyes are separated from each other, image displacement (i.e., parallax), with respect to an object, exists between eyes. The double imaging devices of a binocular camera are somewhat equivalent to human eyes, and thus have also the parallax. In addition, as known from imaging principle, the parallax may vary with the depth of the object with respect to the binocular camera. Therefore, a parallax-depth relation based depth measuring approach has been proposed in relevant art, which measures depth based on the principle regarding parallax of a binocular camera. However, as can be known from mathematical derivation, the measuring accuracy for the depth of a target object is inversely proportional to a square of the depth of the object. In other words, the measuring accuracy decreases as the depth increases and vice versa As can be seen from the above, how to ensure the accuracy of depth measurement in scenes of various depth is an urgent problem to be solved.

SUMMARY

Embodiments of the present application provide a depth measuring method and system to ensure the accuracy of depth measurement in scenes of various depth.

For this purpose, an embodiment of the present application discloses a depth measuring method, applicable to a first binocular camera having a zoom lens, comprising:

obtaining a current depth of a target object to be measured;

determining a focus with which the current depth is measured as a current focus;

determining, according to preset correspondence between depth ranges and focuses, a current reference focus corresponding to a current reference depth range; wherein, the current reference depth range is a depth range within which the current depth falls;

determining whether the current focus is the same as the current reference focus; and if the current focus is the same as the current reference focus, determining the current depth as a target depth of the target object; if the current focus is not the same as the current reference focus, adjusting the current focus to the current reference focus, measuring a current depth of the target object with the adjusted current focus, and proceeding back to the operation of determining, according to preset correspondence between depth ranges and focuses, a current reference focus corresponding to a current reference depth range.

Optionally, obtaining a current depth of a target object to be measured includes measuring a current depth of the target object with a preset focus of the first binocular camera.

Optionally, the first binocular camera is mounted on a pan-tilt; and obtaining a current depth of a target object to be measured comprises: obtaining a current depth of a target object measured by a second binocular camera with a fixed focus; wherein the second binocular camera is mounted on the base of the pan-tilt and has a fixed-focus lens.

Optionally, measuring a current depth of the target object with the adjusted current focus comprises measuring a current depth of the target objet with the adjusted current focus according to an actual distance between left and right lenses of the first binocular camera, and parallax of the first binocular camera.

Optionally, the parallax of the first binocular camera is calculated based on a binocular matching principle.

Optionally, in a case where the left and right lenses have the same focus, measuring a current depth of the target object with the adjusted current focus according to an actual distance between left and right lenses of the first binocular camera and parallax of the first binocular camera comprises:

obtaining a current depth H of the target object according to the following equation:

$$H = \frac{L * f}{\Delta s},$$

wherein, L is the actual distance between left and right lens of the first binocular camera, f is the adjusted current focus of left and right lens of the first binocular camera, and Δs is the parallax of the first binocular camera.

Optionally, before determining, according to preset correspondence between depth ranges and focuses, a current reference focus corresponding to a current reference depth range, the method further comprises:

obtaining a horizontal movement angle and a vertical movement angle of the first binocular camera; wherein, the horizontal movement angle and the vertical movement angle are a horizontal offset angle and a vertical offset angle respectively which are calculated based on geometric relationship between a first central pixel and a second central pixel, and positional relationship between an image acquisition device and the first binocular camera; the first central pixel is a central point of the image area of the target object in a large field-of-view image, and the second central pixel is a central point of the large field-of-view image; the image acquisition device is a device with a large field of view; and the large field-of-view image is an image acquired by the image acquisition device; and adjusting, according to the horizontal movement angle and the vertical movement angle, a shooting angle of the first binocular camera, to position the target object within a field of view of the first binocular camera.

For the purpose above, embodiments of the present application also provide a depth measuring system, comprising:

a first binocular camera configured for obtaining a current depth of a target object to be measured; determining a focus with which the current depth is measured as a current focus; determining, according to preset correspondence between depth ranges and focuses, a current reference focus corresponding to a current reference depth range; wherein, the current reference depth range is a depth range within which the current depth falls; determining whether the current focus is the same as the current reference focus; and if the current focus is the same as the current reference focus, determining the current depth as a target depth of the target object; if the current focus is not the same as the current reference focus, adjusting the current focus to the current reference focus, measuring a current depth of the target object with the adjusted current focus, and proceeding back to the operation of determining, according to preset correspondence between depth ranges and focuses, a current reference focus corresponding to a current reference depth range.

Optionally, the first binocular camera is further configured for measuring a current depth of the target object with a preset focus of the first binocular camera.

Optionally, the first binocular camera is mounted on a pan-tilt, and the depth measuring system further comprises a second binocular camera mounted on the base of the pan-tilt and having a fixed-focus lens; wherein, the first binocular camera is further configured for obtaining a current depth of the target object measured by the second binocular camera with a fixed focus.

Optionally, the first binocular camera is further configured for measuring a current depth of the target object with the adjusted current focus, according to an actual distance between left and right lenses of the first binocular camera, and parallax of the first binocular camera.

Optionally, the parallax of the first binocular camera is calculated based on a binocular matching principle.

Optionally, the first binocular camera is further configured for:

obtaining a current depth H of the target object according to the following equation:

$$H = \frac{L*f}{\Delta s},$$

wherein, L is the actual distance between the left and right lens of the first binocular camera, f is the current focus of the left and right lens of the first binocular camera, and $\Delta s$ is the parallax of the first binocular camera.

Optionally, the system further comprises an image acquisition device mounted on the base of a pan-tilt and having a large field-of-view; wherein, the image acquisition device is configured for obtaining a horizontal movement angle and a vertical movement angle of the first binocular camera; wherein, the horizontal movement angle and the vertical movement angle are a horizontal offset angle and a vertical offset angle respectively which are calculated based on geometric relationship between a first central pixel and a second central pixel, and positional relationship between an image acquisition device and the first binocular camera; the first central pixel is a central point of the image area of the target object in a large field-of-view image, and the second central pixel is a central point of the large field-of-view image; the image acquisition device is a device with a large field of view; and the large field-of-view image is an image acquired by the image acquisition device; and the first binocular camera is configured for obtaining the horizontal movement angle and the vertical movement angle, and adjusting, according to the horizontal movement angle and the vertical movement angle, a shooting angle of the first binocular camera, to position the target object within a field of view of the first binocular camera.

Optionally, the image acquisition device is configured for: obtaining a large field-of-view image containing the target object, and determining a central point of the large field-of-view image; positioning a target area of interest within the large field-of-view image according to a preset area-of-interest positioning rule; determining a central point of the target area of interest according to the preset area-of-interest positioning rule; and calculating the horizontal movement angle and the vertical movement angle based on the central point of the target area-of-interest and the central point of the large field-of-view image.

Optionally, the image acquisition device is configured for calculating the horizontal movement angle and the vertical movement angle according to the following equations:

$$\theta_x = \arctan\frac{\Delta x}{f},$$

$$\theta_y = \arctan\frac{\Delta y}{f};$$

wherein, $\Delta x$ is a projection distance in the horizontal direction of a line between the central point of the target area-of-interest and the central point of the large field-of-view image, $\Delta y$ is a projection distance in the vertical direction of a line between the central point of the target area of interest and the central point of the large field-of-view image.

Optionally, the system further comprises a speckle projection device configured for forming randomly distributed speckles on the surface of the target object.

The present application provides a depth measuring method and system applicable to a first binocular camera with a zoom lens. In depth measurement, the first binocular camera first obtains a current depth of a target object to be measured, and determines a focus with which the current depth is measured as a current focus. The first binocular camera then determines, according to preset correspondence between depth ranges and focuses, a current reference focus corresponding to a current reference depth range. The first binocular camera further determines whether the current focus is the same as the current reference focus. If the current focus is the same as the current reference focus, the current depth is determined as a target depth of the target object; if the current focus is not the same as the current reference focus, the current focus is adjusted to the current reference focus. The first binocular camera then measures a current depth of the target object with the adjusted current focus. At this point, the method proceeds back to the operation of determining, according to preset correspondence between depth ranges and focuses, a current reference focus corresponding to a current reference depth range.

As can be seen from the above mathematical derivations, the measuring accuracy of the depth of the target object is related not only to the depth of the target object, but also to the focus of the first binocular camera used to measure the target object. In embodiments of the present application for depth measurement, instead of using a binocular camera with a fixed-focus lens for depth measurement, an object in various depth ranges is measured with a varying focus. As such, the influence a depth of the target object has on the measuring accuracy is reduced, and the accuracy of the depth measurement of the target object is thus improved.

BRIEF DESCRIPTION OF THE DRAWINGS

To describe the technical solutions of embodiments of the present application and the prior art more clearly, the accompanying drawings used in the embodiments and the prior art are briefly described below. Obviously, the accompanying drawings described below are merely some embodiments of the present application, and those skilled in the art can obtain other drawings based on these drawings without creative efforts.

DETAILED DESCRIPTION

To make the objectives, technical solutions, and advantages of the present application more comprehensible, detailed description is provided below in association with embodiments with reference to the accompanying drawings. Obviously, the described embodiments are merely a part of but not all the embodiments of the present application. All other embodiments obtained without creative efforts in view of the embodiments of the present application by those skilled in the art fall within the scope of the present application.

To ensure the accuracy of the depth measurement in scenes of various depth, a depth measuring method and system is provided in embodiments of the present application.

A depth measuring method and system provided by an embodiment of the present application is illustrated in the following.

The depth measuring method provided in the embodiment of the present application is applicable to a first binocular camera with zoom lens.

It should be noted that the first binocular camera involved in the embodiment of the present application may be a standalone binocular camera. For example, the binocular camera may be an integrated device having two lenses, two imaging sensors, and an image processor. The first binocular camera may also be constructed by two monocular cameras. The embodiment of the present application is not limited in this aspect.

It should be noted that a camera is capable of imaging through a lens. A lens that has a variable focus is referred to as a zoom lens. For example, the lens of a SLR camera is a typical zoom lens, the focus of which can be adjusted through rotation of a mechanical structure on the housing of the lens, so as to be capable of optical zoom. As such, the camera can have different imaging features, for example, a captured object can be zoomed in or out.

Figure 1:
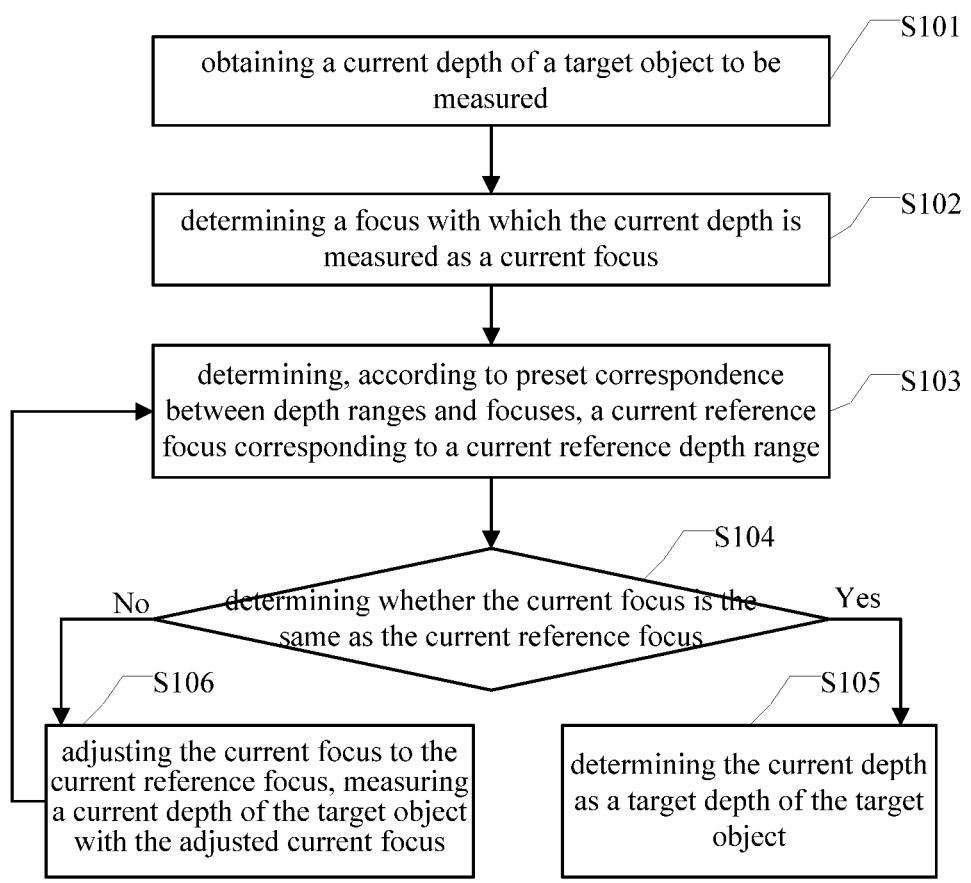
FIG. 1 is a schematic flowchart of a depth measuring method according to an embodiment of the present application.

Specifically, the depth measuring method shown in FIG. 1 may include the following operations.

At S101, a current depth of an object to be measured is obtained.

It is noted that the current depth as obtain merely serves as an initial measuring depth of a target object to be measured but not a target depth of the object, and typically has an accuracy not so high. Subsequent steps are required to obtain the target depth of the object with a high accuracy.

In addition, there are a plurality of ways to obtain the current depth of the object to be measured. For example, in one implementation, the current depth of the object may be measured with a preset focus of the first binocular camera.

It should be noted that, as the first binocular camera has a zoom lens, a preset focus is required for the first binocular camera to measure a depth. The value of the preset focus is not limited in embodiments of the present application, but can be set by those skilled in the art as desired in practice. For example, the focus of the first binocular camera may be empirically determined.

In another implementation, the first binocular camera is mounted on a pan-tilt. As such, the first binocular camera may obtain a current depth of an object measured by a second binocular with a fixed focus. The second binocular camera is mounted on the base of the pan-tilt, and has a fixed-focal lens.

It should be noted that the second binocular camera in the embodiment of the present application may be a standalone binocular camera. For example, the standalone binocular camera may be an integrated device having two lenses, two imaging sensors and an image processor. The second binocular camera may also be constructed by two monocular cameras. The embodiment of the present application is not limited in this aspect.

It should be noted that in this implementation, the second binocular camera with a fixed-focal lens may be used to measure a current depth of the object (i.e., the initial measuring depth), and then the first binocular camera may obtain the current depth measured by the second binocular camera.

As shown above, in the first implementation, there is no need for additional hardware, while in the second implementation, a second binocular camera is required. It should be noted that, the field of view of a binocular camera typically decrease as the focus increases. Therefore, a problem may arise that an object cannot be positioned in the field of view of the first binocular camera. In such a case, the shooting angle of the first binocular camera may have to be adjusted so that the object can be positioned. However, the second binocular camera typically has a large field of view. Therefore, the problem that an object cannot be positioned within the field of view typically does not exist when the second binocular camera having a fixed-focal lens is utilized to determine an area in which the object resides. Either implementation may be appropriately utilized as desired in practice to measure the initial depth of the target object.

It should be noted that the implementations above for obtaining a current depth of a target object to be measured are provided as examples instead of limitations on embodiments of the present application.

At S102, a focus with which the current depth is measured is determined as a current focus.

Specifically, when the first binocular camera obtains the current depth of the target object (i.e., the initial depth), it may also obtain the focus with which the initial depth is measured. It should be noted that, in this operation, the focus with which the current depth (i.e., the initial depth) is measured can be determined as a current focus. Specifically, when the initial depth is obtained by the first binocular camera, the current focus is the preset focus with which the initial depth is measured. When the initial depth is measured through a second binocular camera, the current focus is the focus of a fixed-focal lens of the second binocular camera.

In addition, in a case where the first binocular camera is utilized to obtain the initial depth, the preset focus with which the initial depth is measured has a preset value, for example, a value empirically set by those skilled in the art. It should also be noted that the value of this preset focus is not limited in this embodiment.

At S103, a current reference focus corresponding to a current reference depth range is determined according to preset correspondence between depth ranges and focuses; wherein, the current reference depth range is a depth range within which the current depth falls.

It should be noted that, in this operation, reference depth ranges corresponding to scenes of different depth are defined, and a reference focal is set for each reference depth range. The embodiment of the present application is not limited as to the manner in which the reference depth ranges are defined. For example, the number and sizes of reference depth ranges and the specific value of the reference focus corresponding to each reference depth range are not limited, but can be appropriately and empirically set by those skilled in the art as desired in practical application. For example, the specific value of the reference focus corresponding to each reference depth range may be set according to the practical experience in measuring.

Specifically, after the first binocular camera obtains the current depth of the target object and the current focus corresponding to this depth, a current reference focus corresponding to the current depth may be determined according to the correspondence between the preset depth ranges and focuses. The current reference focus can be used in subsequent operations.

Specifically, the current reference depth range refers to a depth range within which the current depth is. It should be noted that, the current depth may be the initial measurement depth obtained by the first binocular camera, or a depth (non-initial measuring depth) obtained with an adjusted focus of the zoom lens of the first binocular.

At S104, a determination is made as to whether the current focus is the same as the current reference focus; if the current focus is the same as the current reference focus, the method proceeds to S105; or otherwise, operation S106 is performed.

Specifically, after a current reference focus corresponding to a current reference depth range is determined according to preset correspondence between depth ranges and focuses, the current reference focus is to be compared with the current focus with which the current depth is measured, so that a target depth for the target object can be obtained based on the comparison in subsequent operations.

At S105, the current depth is determined as a target depth of the target object.

Specifically, in the case where the current focus is determined to be the same as the current reference focus, the current depth corresponding to the current focus may be directly determined as the target depth of the target object.

At S106, the current focus is adjusted to the current reference, and a current depth of the target object is measured with the adjusted current focus. The method then proceeds back to S103, wherein a current reference focus corresponding to a current reference depth range is determined according to preset correspondence between depth ranges and focuses.

Specifically, in a case where the current focus is determined to be different from the current reference focus, the current depth cannot be directly determined as the target depth of the target object. Rather, the current focus is adjusted to the current reference focus. The first binocular camera then measures a new current depth of the target object according to the adjusted current focus, and determines, according to the new current depth, a corresponding current reference focus. The first binocular camera then determines again if the current reference focus is the same as the current focus. These operations are repeated until a determination is made that a current focus is the same as a current reference focus. Then the target depth of the target object is obtained in the operation of S105.

The process from step S103 to step S106 is a cyclic process, in which, through comparison with a current reference focus, the current focus with which a current depth of the target object is measured can be adjusted, until it is the same as a current reference focus. The reference focus corresponding to each reference depth range is generally preset for a higher measuring accuracy. Therefore, in a case where a current focus is the same as a current reference focus, a current depth measured with the current focus would have a higher accuracy which can satisfy measurement requirements, and can thus be determined as a target depth of the target object.

It should also be noted that the first binocular camera may be mounted on a pan-tilt which can adjust the shooting angle of the camera. As such, in case the field of view of the first binocular camera decreases due to adjustment of focus, the shooting angle of the camera can be adjusted through rotation of the pan-tilt, so that the target object can be positioned within the field of view of the first binocular camera. Of course, the pan-tilt listed here is only illustrative and should not be construed as a limitation on the application.

As a specific implementation of the embodiment of the present application, a current depth of the target object may be measured with the adjusted current focus according to an actual distance between the left and right lenses of the first binocular camera and the parallax of the first binocular camera. In one implementation, the parallax of the first binocular camera is calculated based on a binocular matching principle. It should be noted that, calculation of the parallax of the first binocular camera based on the binocular matching principle mentioned herein is only an example, and should not be construed as a limitation on the calculation of parallax.

Figure 2:
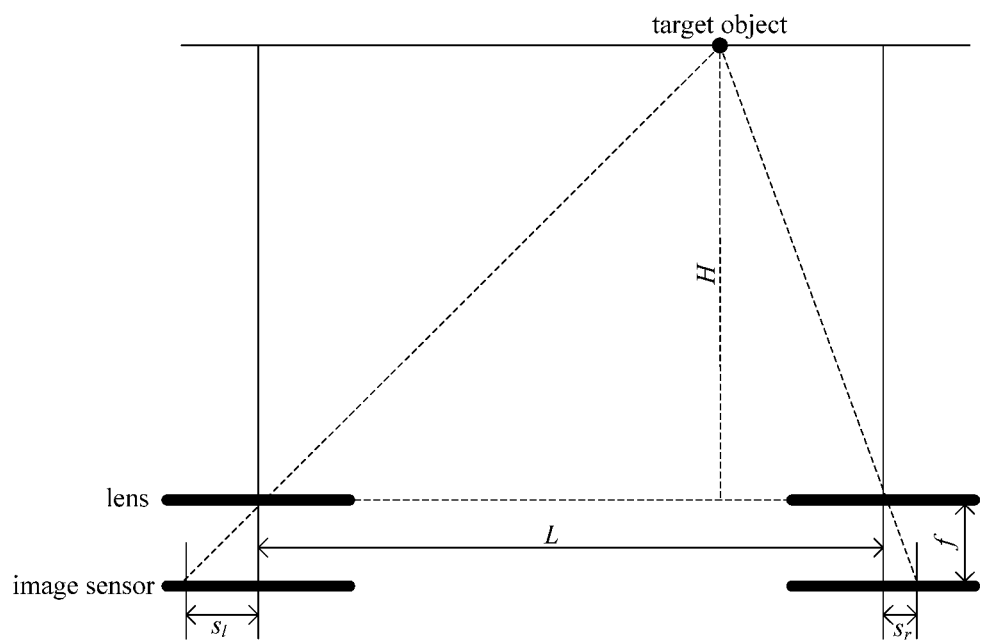
FIG. 2 is a schematic diagram illustrating geometric relationship between a target object and a first binocular camera according to an embodiment of the present application.

More specifically, the following equation can be obtained from the geometries as shown in FIG. 2, and used to measure a current depth H of the target object:

$$H = \frac{L*f}{\Delta s},$$

Wherein, L is an actual distance between the left and right lens of the first binocular camera, f is the adjusted current focus of the left and right lens of the first binocular camera, and Δs is the parallax of the first binocular. Δs is the sum of $s_l$ and $s_r$. $s_l$ is a distance between the imaging point of the target object on the left camera of the first binocular camera and the central point of an image acquired by the left camera, $s_l$ is the distance between the imaging point of the target object on the right camera of the first binocular camera and the central point of an image acquired by the right camera.

It should be noted that the equation described above are derived based on the geometries. Embodiments of the present application are not limited as to how the current depth of the target object is measured. Those skilled in the art can adopt appropriate approaches as required in practice.

An absolute error of the current depth measured by the first binocular camera can be obtained through a first derivation of the above equation as follows:

$$d_H = \frac{H^2}{L*f} d_{\Delta s}$$

As shown above, the absolute error for the measurement of the target object is proportional to the depth of the target object, and inversely proportional to the focus of the first binocular camera with which the depth is measured. Specifically, as the depth increases, the absolute error increases, and the measuring accuracy of the depth of the target object becomes lower. On the other hand, as the focus with which the depth of the target object is measured by the first binocular camera increases, the absolute error becomes smaller, and the measuring accuracy of the depth of the target object increases.

It is noted that, the equation for measuring the current depth of the target object derived from the geometries shown in FIG. 2 and the first derivation of the equation are only examples and should not be construed as limitations on embodiments of the present application.

As can be seen from the above mathematical derivations, the measuring accuracy of the depth of the target object is related not only to the depth of the target object, but also to the focus of the first binocular camera used to measure the target object. In embodiments of the present application for depth measurement, instead of using a binocular camera with a fixed-focus lens for depth measurement, an object in various depth ranges is measured with a varying focus. As such, the influence a depth of the target object has on the measuring accuracy is reduced, and the accuracy of the depth measurement of the target object is thus improved.

Figure 3:
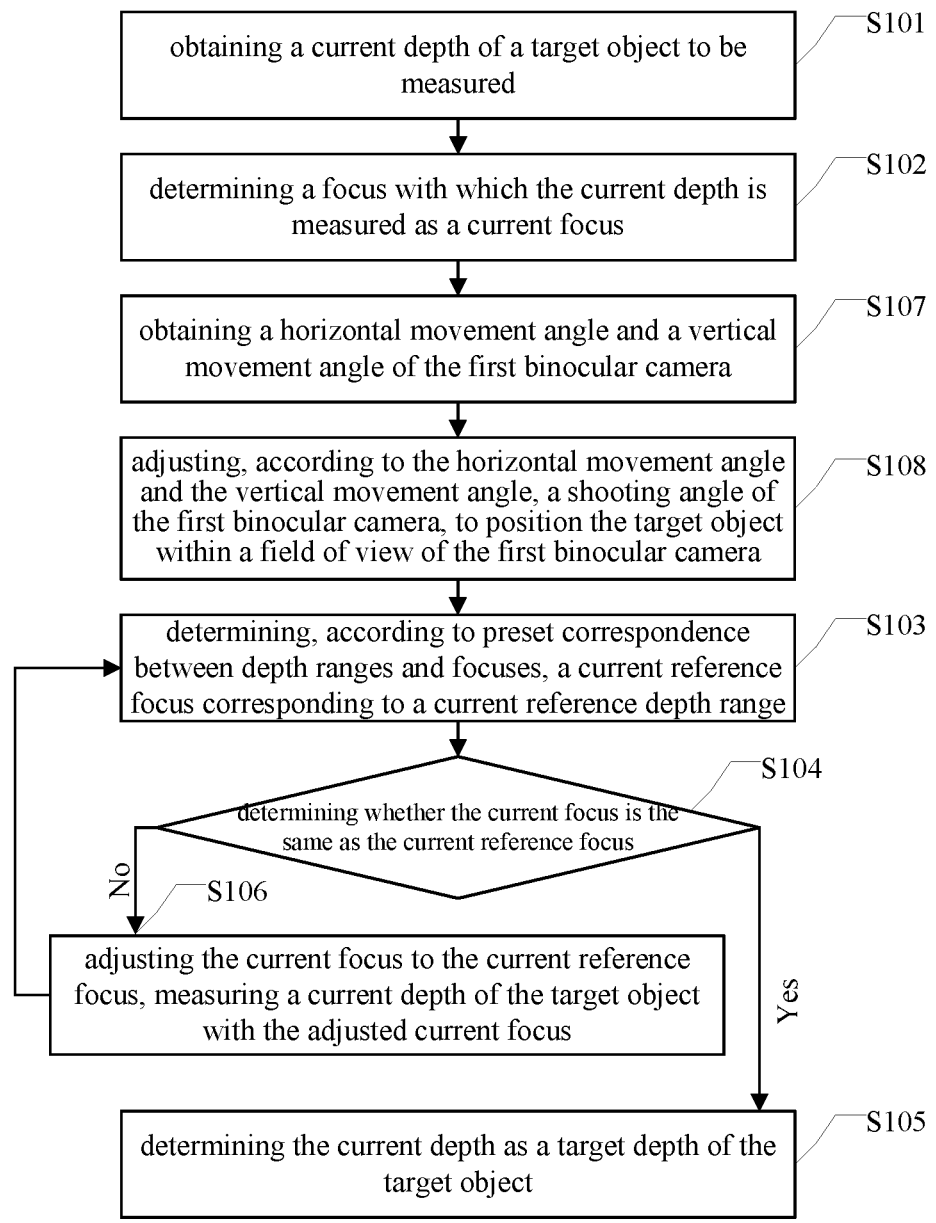
FIG. 3 is a schematic flowchart of another depth measuring method according to an embodiment of the present disclosure.

As shown in FIG. 3, before the operation S103 of the embodiment illustrated by FIG. 1, wherein, a current reference focus corresponding to a current reference depth range is determined according to preset correspondence between depth ranges and focuses, the method may further include the following operations.

At S107, a horizontal movement angle and a vertical movement angle of the first binocular camera are obtained.

Figure 4:
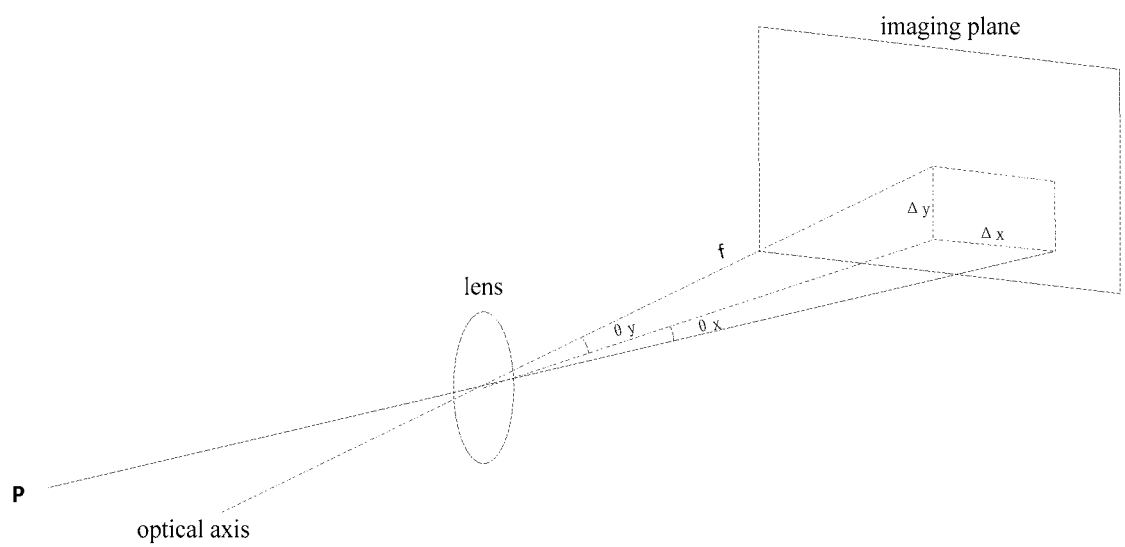
FIG. 4 is a schematic diagram illustrating geometric relationship for calculation of a horizontal movement angle and a vertical movement angle according to an embodiment of the present disclosure.

Wherein, as shown in FIG. 4, the horizontal movement angle and the vertical movement angle are: a horizontal direction offset angle and a vertical direction offset angle respectively which are computed based on geometric relationship between a first central pixel and a second central pixel, and positional relationship between an image acquisition device and the first binocular camera; the first central pixel is the central point of the image area of the target object in a large field-of-view image, and the second central pixel is the central point of the large field-of-view image; the image acquisition device is a device with a large field of view, and the large field-of-view image is an image acquired utilizing the image acquisition device.

The image acquisition device may be a second binocular camera mounted on the base of a pan-tilt and having a fixed focus. The image acquisition may also be a monocular camera mounted on the base of the pan-tilt. Embodiments of the present application are not limited as to the specific form of the image acquisition device. In one embodiment of the present application, the second binocular camera or the monocular camera may have a large field of view, so that an area corresponding to the target object can be positioned within the large field-of-view image. For example, this image acquisition device on the base of the pan-tilt is a monocular camera with a wide-angle lens.

At S108, a shooting angle of the first binocular camera is adjusted according to the horizontal movement angle and the vertical movement angle to position the target object within the field of view of the first binocular camera.

According to the imaging principle of a camera, for a target surface of an image sensor having a fixed size, the larger the focus of the zoom lens, the smaller the field of view field the camera has. Therefore, in an attempt to increase measuring accuracy of the depth of the target object by increasing the focus of the zoom lens, the problem that the target object cannot be positioned within a reduced field of view has to be taken into account.

It is also noted that the embodiment of the present application does not define the sequence of execution of steps S101-S102 and steps S107-S108. Specifically, steps S107-S108 may be performed before or after steps S101-S102.

It can be seen from step S107 and S108, when the current depth is measured by the first binocular camera, a horizontal offset angle (i.e., $\theta_x$ in FIG. 4) and a vertical direction offset angle (i.e., $\theta_y$ in FIG. 4) of the first binocular camera from the central point of the target object may be first obtained. The first binocular camera is then adjusted according to the obtained horizontal movement angle and the vertical movement angle, to position the target object within the field of view of the first binocular camera. It can be seen that, when the depth measurement is performed by using the solution provided by the method embodiment shown in FIG. 3, in addition to all the advantages of the method embodiment shown in FIG. 1, it can be further solved the problem that the target object cannot be positioned within the view field range due to the reduced field-of-view range of the first binocular camera.

In correspondence with the method embodiment above, embodiments of the present application further provide a depth measuring system.

A depth measuring system provided by an embodiment of the present application may include a first binocular camera configured for obtaining a current depth of a target object to be measured; determining a focus with which the current depth is measured as a current focus; determining, according to preset correspondence between depth ranges and focuses, a current reference focus corresponding to a current reference depth range; wherein, the current reference depth range is a depth range within which the current depth falls; determining whether the current focus is the same as the current reference focus; and if the current focus is the same as the current reference focus, determining the current depth as a target depth of the target object; if the current focus is not the same as the current reference focus, adjusting the current focus to the current reference focus, measuring a current depth of the target object with the adjusted current focus, and proceeding back to the operation of determining, according to preset correspondence between depth ranges and focuses, a current reference focus corresponding to a current reference depth range.

As can be seen from the above mathematical derivations, the measuring accuracy of the depth of the target object is related not only to the depth of the target object, but also to the focus of the first binocular camera used to measure the target object. In embodiments of the present application for depth measurement, instead of using a binocular camera with a fixed-focus lens for depth measurement, an object in various depth ranges is measured with a varying focus. As such, the influence a depth of the target object has on the measuring accuracy is reduced, and the accuracy of the depth measurement of the target object is thus improved.

Specifically, the first binocular camera is configured for measuring a current depth of the target object with a preset focus of the first binocular camera.

Figure 5:
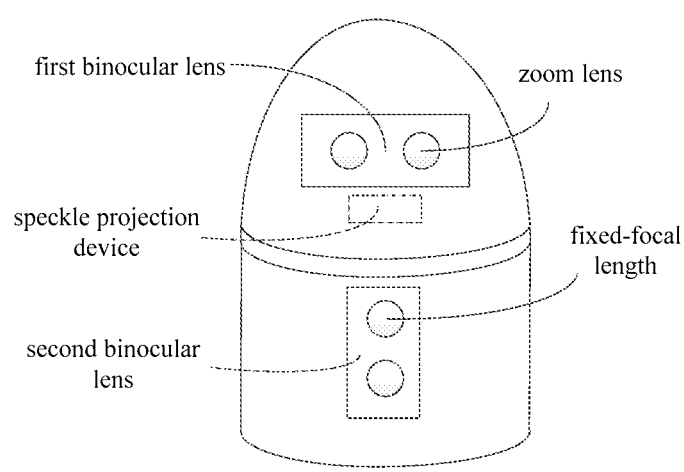
FIG. 5 is a schematic structure diagram of a depth measuring system according to an embodiment of the present disclosure.

In one implementation, as shown in FIG. 5, the first binocular camera is mounted on a pan-tilt, and the depth measuring system further includes a second binocular camera mounted on the base of the pan-tilt and having a fixed focus. The first binocular camera is used to obtain the current depth of the target object measured by the second binocular camera with the fixed focus.

It should be noted that the first binocular camera or the second binocular camera involved in the embodiment of the present application may be a standalone binocular camera, and may also be a binocular camera constructed by two monocular cameras, embodiments of the present application are not limited as to the form of the first binocular camera and the second binocular camera.

Specifically, the first binocular camera is configured for measuring a current depth of the target object with the adjusted current focus according to an actual distance between the left and right lenses of the first binocular camera and the parallax of the first binocular camera. The parallax of the first binocular camera is calculated based on the binocular matching principle.

In one implementation, the first binocular camera is configured for obtaining a current depth H of the target object according to the following equation:

$$H = \frac{L * f}{\Delta s},$$

wherein, L is the actual distance between the left and right lens of the first binocular camera, f is the current focus of the left and right lens of the first binocular camera, Δs is the parallax of the first binocular camera.

Specifically, the system further includes an image acquisition device mounted on the base of a pan-tilt and having a large field-of-view.

It should be noted that, the image acquisition device mounted on the base of the pan-tilt mentioned above may be a single monocular camera, or a binocular camera. The specific form of the image acquisition device is not limited in embodiments of the present application and can be appropriately utilized by one of ordinary skill as desired in practice. For example, this image acquisition device may be a monocular camera with a wide-angle lens.

The image acquisition device is configured for measuring a horizontal movement angle and a vertical movement angle to be adjusted of the first binocular camera.

The horizontal movement angle and the vertical movement angle are a horizontal offset angle and a vertical offset angle respectively which are calculated based on geometric relationship between a first central pixel and a second central pixel, and positional relationship between an image acquisition device and the first binocular camera. The first central pixel is a central point of the image area of the target object in a large field-of-view image, and the second central pixel is a central point of the large field-of-view image; the image acquisition device is a device with a large field of view. The large field-of-view image is an image acquired by the image acquisition device.

The first binocular camera is configured for obtaining the horizontal movement angle and the vertical movement angle, and adjusting, according to the horizontal movement angle and the vertical movement angle, a shooting angle of the first binocular camera, to position the target object within a field of view of the first binocular camera.

In one specific implementation of the embodiment of the present application, the image acquisition device is configured for:

(1) obtaining a large field-of-view image containing the target object, and determining a central point of the large field-of-view image.

Specifically, a large field-of-view image containing the target object may be obtained by the image acquisition device. According to the size of the large field-of-view image, the central point of the large field-of-view image may be determined. It should be noted that, the calculation of the central point is only related to the size of the large field-of-view image, and is not influenced by the content of the large field-of-view image.

(2) positioning a target area of interest within the large field-of-view image according to a preset area-of-interest positioning rule;

In one implementation, the target area of interest corresponding to the target object in a large field-of-view image may be positioned based on the image feature of the target object. For example, a face image area in a large field-of-view image may be positioned based on face features, and a vehicle image area in a large field-of-view image may be positioned based on vehicle features. It should be noted that, the specific manners as list above in which a target area of interest is positioned are only examples and should not be construed as a limitation.

(3) determining a central point of the target area of interest based on the preset area-of-interest positioning rule.

In one implementation, a central point of a minimum circumscribed rectangle of a target area-of-interest may be determined as the central point of the target area-of-interest. It should be noted that, the manners listed above in which a central point of the target area-of-interest is determined are only examples and should not be construed as a limitation on embodiments of the application.

(4) calculating the horizontal movement angle and the vertical movement angle based on the central point of the target area of interest and the central point of the large field-of-view image.

Specifically, the image acquisition device is configured for calculating the horizontal movement angle and the vertical movement angle according to the following equations:

$$\theta_x = \arctan\frac{\Delta x}{f},$$

$$\theta_y = \arctan\frac{\Delta y}{f};$$

wherein, Δx is a projection distance in the horizontal direction of a line between the central point of the target area-of-interest and the central point of the large field-of-view image, Δy is a projection distance in the vertical direction of a line between the central point of the target area of interest and the central point of the large field-of-view image.

As shown in FIG. 5, in another specific implementation of the present application, the system may further include: a speckle projection device configured for forming randomly distributed speckles on the surface of the target object.

Figure 6:
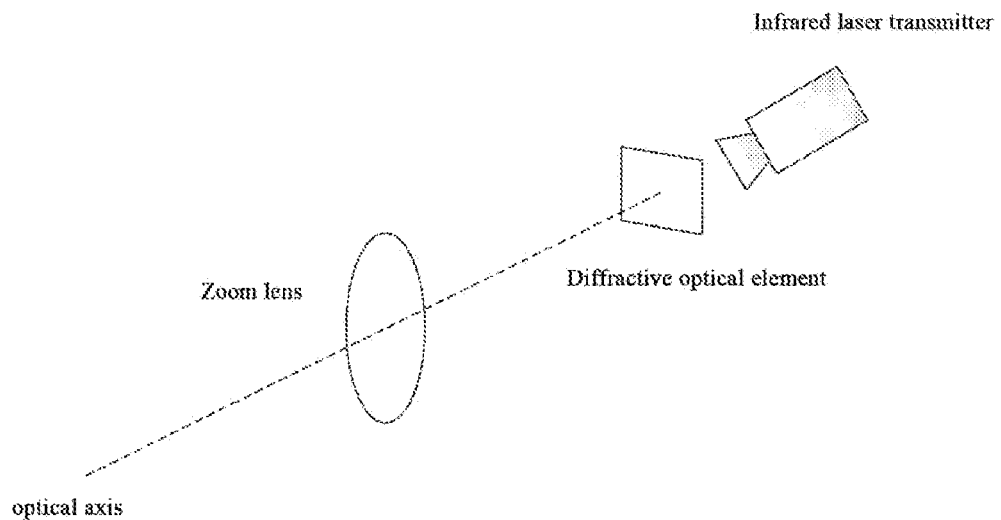
FIG. 6 is a schematic installation diagram of a diffractive optical element according to an embodiment of the present application.

In one implementation as shown in FIG. 6, the speckle projection device described above may include: an infrared laser emitter, a diffractive optical element, and a zoom lens. The infrared light emitted by the infrared laser emitter passes through the diffractive optical element to form randomly distributed speckles on the surface of the target object. The speckle projection device may be located adjacent to the first binocular camera.

Correspondingly, the first binocular camera may further be able to receive infrared light in addition to visible light.

The diffractive optical element of the speckle projection device may be mounted in front of the infrared laser emitter, and the zoom lens of the speckle projection device may be mounted in front of the diffractive optical element. In this way, the infrared light or infrared laser light emitted by the infrared laser emitter can land on the diffractive optical element and get diffracted. As such, speckles are projected with an emission angle. Through a zoom lens mounted in front of the diffractive optical element, the exit angle of the speckles can be adjusted to match the field of view of the first binocular camera. The coverage of the speckles can be adjusted, thereby so as to add textures to the target object within the coverage of the speckles.

The depth measuring method provided in the embodiment of the present application is performed based on geometric relationship between the parallax for a target object and the depth of the object. The parallax of the target object is calculated through a binocular matching algorithm. Specifically, the calculation may be based on a matching of the target object in the images captured by the left and right cameras of the first binocular camera.

At present, there are mainly two kinds of binocular matching algorithms, i.e., global matching algorithm and local matching algorithm. Compared to the global matching algorithm, the local matching algorithm has low computational complexity and is easy to implement. However, for an area having fewer textures in a captured image, a problem typically occurs that an object in a left image does not match with that in a right image. Randomly distributed speckles can be projected onto the surface of an object with the speckle projection device mounted in the depth measuring system. As such, textures in the area corresponding to the target object in the captured image are increased. This may facilitate improving success rate and the accuracy rate for a match between the target object in the left image and the object in the right image captured by a first binocular camera.

A brief introduction is provided to the system embodiment in view of the resemblance with the method embodiments. Relevant details can be obtained with reference to the description of the method embodiments.

Figure 7:
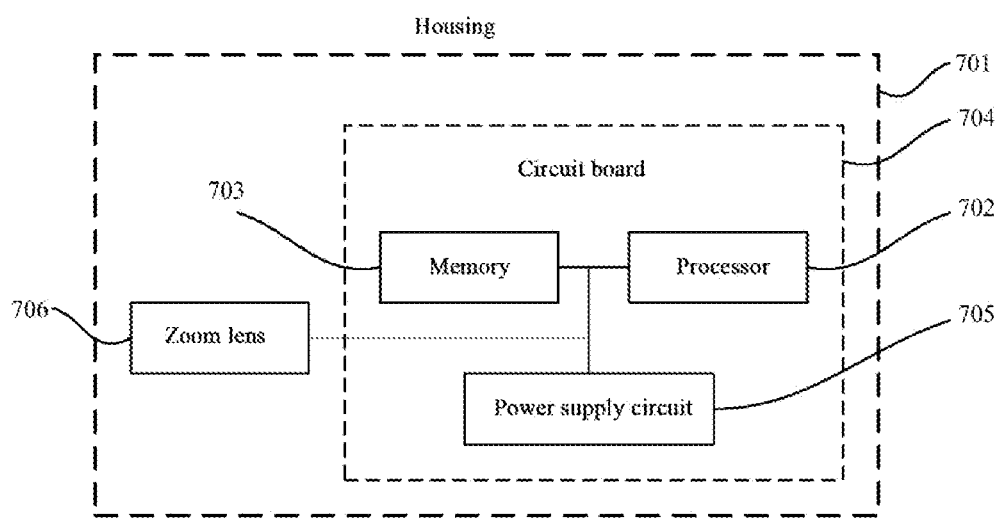
FIG. 7 is a schematic structure diagram of a binocular camera according to an embodiment of the present disclosure.

Embodiments of the present application further provide a binocular camera. The camera includes, as shown in FIG. 7, a housing 701, a processor 702, a memory 703, a circuit board 704, a power supply circuit 705, and a zoom lens 706, wherein the circuit board 704 is arranged within a space enclosed by the housing 701, the processor 702 and the memory 703 are disposed on the circuit board 704; the power supply circuit 705 is configured to supply power to circuits or devices of the binocular camera; the memory 703 is configured to store executable program codes; the zoom lens 706 is configured to acquire images and adjust the focus; the processor 702 is configured to read and execute the program codes stored in the memory 703 so as to perform the depth measurement method. The method includes:

obtaining a current depth of a target object to be measured; determining a focus used when the current depth is measured as a current focus; determining, according to the correlation between preset depth ranges and focuses, a current reference focus corresponding to a current reference depth range; wherein, the current reference depth range is a depth range in which the current depth falls; determining whether the current focus is the same as the current reference focus; and if the current focus is the same as the current reference focus, determining that the current depth is the target depth of the target object; if the current focus is not the same as the current reference focus, setting the current focus to equal the current reference focus, measuring a current depth of the target object with the set current focus, and returning to the step of determining, according to the correlation between preset depth ranges and focuses, a current reference focus corresponding to a current reference depth range.

The binocular camera may be a standalone binocular camera. For example, the binocular camera may be an integrated device with two lens, two imaging sensor and an image processor. The binocular camera may also be a binocular camera constructed by two monocular cameras. Embodiments of the present application are not limited in this aspect.

According to the mathematical derivation relationship, the measuring accuracy of the target object is related to the measurement of the focus of the first binocular camera of this target object, in addition to the depth of the target object; therefore, when the depth measurement is performed by using the solution of the present application embodiment shown in FIG. 8, the different focuses can be selected for the target objects in different depth ranges for measurement, but not by using a binocular camera with a prime lens for depth measurement, thereby the influence of the depth of the target object for the measuring accuracy is reduced, and the accuracy of the depth measurement of the target object.

The embodiment of the present application further provides an executable program code which, when being executed, performs the depth measurement method. The method includes:

obtaining a current depth of a target object to be measured;

determining a focus with which the current depth is measured as a current focus;

determining, according to preset correspondence between depth ranges and focuses, a current reference focus corresponding to a current reference depth range; wherein, the current reference depth range is a depth range within which the current depth falls;

determining whether the current focus is the same as the current reference focus; and if the current focus is the same as the current reference focus, determining the current depth as a target depth of the target object; if the current focus is not the same as the current reference focus, adjusting the current focus to the current reference focus, measuring a current depth of the target object with the adjusted current focus, and proceeding back to the operation of determining, according to preset correspondence between depth ranges and focuses, a current reference focus corresponding to a current reference depth range.

As can be seen from the above mathematical derivations, the measuring accuracy of the depth of the target object is related not only to the depth of the target object, but also to the focus of the first binocular camera used to measure the target object. In embodiments of the present application for depth measurement as shown in FIG. 8, instead of using a binocular camera with a fixed-focus lens for depth measurement, an object in various depth ranges is measured with a varying focus. As such, the influence a depth of the target object has on the measuring accuracy is reduced, and the accuracy of the depth measurement of the target object is thus improved.

Embodiment of the present application further provide a storage medium having executable program codes stored thereon which, when being executed, performs the depth measuring method. The method includes:

obtaining a current depth of a target object to be measured;

determining a focus with which the current depth is measured as a current focus;

determining, according to preset correspondence between depth ranges and focuses, a current reference focus corresponding to a current reference depth range; wherein, the current reference depth range is a depth range within which the current depth falls;

determining whether the current focus is the same as the current reference focus; and if the current focus is the same as the current reference focus, determining the current depth as a target depth of the target object; if the current focus is not the same as the current reference focus, adjusting the current focus to the current reference focus, measuring a current depth of the target object with the adjusted current focus, and proceeding back to the operation of determining, according to preset correspondence between depth ranges and focuses, a current reference focus corresponding to a current reference depth range.

As can be seen from the above mathematical derivations, the measuring accuracy of the depth of the target object is related not only to the depth of the target object, but also to the focus of the first binocular camera used to measure the target object. In embodiments of the present application for depth measurement, instead of using a binocular camera with a fixed-focus lens for depth measurement, an object in various depth ranges is measured with a varying focus. As such, the influence a depth of the target object has on the measuring accuracy is reduced, and the accuracy of the depth measurement of the target object is thus improved.

It should be noted that the relationship terms used here, such as "first", "second", and the like are only used to distinguish one entity or operation from another entity or operation, but do not necessarily require or imply that there is actual relationship or order between these entities or operations. Moreover, the terms "include", "comprise", or any variants thereof are intended to cover a non-exclusive inclusion, such that processes, methods, articles, or devices, including a series of elements, include not only those elements that have been listed, but also other elements that have not specifically been listed or the elements intrinsic to these processes, methods, articles, or devices. Without further limitations, elements limited by the wording "include(s) a/an . . . ", "comprise(s) a/an . . . " do not exclude additional identical elements in the processes, methods, articles, or devices, including the listed elements.

It will be understood by those of ordinary skill in the art that all or part of the process in implementing the foregoing embodiment method can be completed by a computer program to instruct related hardware. The program can be stored in a computer readable storage medium, which, when executed, can include the flow of the embodiments of the method described above. The storage medium may be a magnetic disk, an optical disk, a read-only memory (ROM), or a random access memory (RAM).

The embodiments described above are simply preferable embodiments of the present application, and are not intended to limit the scope of protection of the present application. Any modifications, alternatives, improvements, or the like within the spirit and principle of the present application shall be included within the scope of protection of the present application.

The invention claimed is:

1. A depth measuring method applicable to a first binocular camera having a zoom lens, comprising:

obtaining a current depth of a target object to be measured;

determining a focus with which the current depth is measured as a current focus;

obtaining a horizontal movement angle and a vertical movement angle of the first binocular camera; wherein, the horizontal movement angle and the vertical movement angle are a horizontal offset angle and a vertical offset angle respectively which are calculated based on geometric relationship between a first central pixel and a second central pixel, and positional relationship between an image acquisition device and the first binocular camera; the first central pixel is a central point of the image area of the target object in a large field-of-view image, and the second central pixel is a central point of the large field-of-view image; the image acquisition device is a device with a large field of view; and the large field-of-view image is an image acquired by the image acquisition device;

adjusting, according to the horizontal movement angle and the vertical movement angle, a shooting angle of the first binocular camera, to position the target object within a field of view of the first binocular camera;

determining, according to preset correspondence between depth ranges and focuses, a current reference focus corresponding to a current reference depth range; wherein, the current reference depth range is a depth range within which the current depth falls;

determining whether the current focus is the same as the current reference focus; and if the current focus is the same as the current reference focus, determining the current depth as a target depth of the target object; if the current focus is not the same as the current reference focus, adjusting the current focus to the current reference focus, measuring a current depth of the target object with the adjusted current focus, and proceeding back to the operation of determining, according to preset correspondence between depth ranges and focuses, a current reference focus corresponding to a current reference depth range.

2. The method of claim 1, wherein, obtaining a current depth of a target object to be measured comprises:
  measuring a current depth of the target object with a preset focus of the first binocular camera.

3. The method of claim 1, wherein, measuring a current depth of the target object with the adjusted current focus comprises:
  measuring a current depth of the target object with the adjusted current focus according to an actual distance between left and right lenses of the first binocular camera, and parallax of the first binocular camera.

4. The method of claim 3, wherein, the parallax of the first binocular camera is calculated based on a binocular matching principle.

5. The method of claim 3, wherein, in a case where the left and right lenses have the same focus, measuring a current depth of the target object with the adjusted current focus according to an actual distance between left and right lenses of the first binocular camera and parallax of the first binocular camera comprises:
  obtaining a current depth H of the target object according to the following equation:

$$H = \frac{L*f}{\Delta s},$$

wherein, L is the actual distance between left and right lens of the first binocular camera, f is the adjusted current focus of left and right lens of the first binocular camera, and $\Delta s$ is the parallax of the first binocular camera.

6. A depth measuring system, comprising:
  a first binocular camera configured for obtaining a current depth of a target object to be measured; determining a focus with which the current depth is measured as a current focus; determining, according to preset correspondence between depth ranges and focuses, a current reference focus corresponding to a current reference depth range; wherein, the current reference depth range is a depth range within which the current depth falls; determining whether the current focus is the same as the current reference focus; and if the current focus is the same as the current reference focus, determining the current depth as a target depth of the target object; if the current focus is not the same as the current reference focus, adjusting the current focus to the current reference focus, measuring a current depth of the target object with the adjusted current focus, and proceeding back to the operation of determining, according to preset correspondence between depth ranges and focuses, a current reference focus corresponding to a current reference depth range; and
  an image acquisition device mounted on the base of a pan-tilt and having a large field-of-view; wherein,
  the image acquisition device is configured for obtaining a horizontal movement angle and a vertical movement angle of the first binocular camera; wherein, the horizontal movement angle and the vertical movement angle are a horizontal offset angle and a vertical offset angle respectively which are calculated based on geometric relationship between a first central pixel and a second central pixel, and positional relationship between an image acquisition device and the first binocular camera; the first central pixel is a central point of the image area of the target object in a large field-of-view image, and the second central pixel is a central point of the large field-of-view image; the image acquisition device is a device with a large field of view; and the large field-of-view image is an image acquired by the image acquisition device; and
  the first binocular camera is configured for obtaining the horizontal movement angle and the vertical movement angle, and adjusting, according to the horizontal movement angle and the vertical movement angle, a shooting angle of the first binocular camera, to position the target object within a field of view of the first binocular camera.

7. The system of claim 6, wherein, the first binocular camera is further configured for:
  measuring a current depth of the target object with a preset focus of the first binocular camera.

8. The system of claim 6, wherein, the first binocular camera is further configured for:
  measuring a current depth of the target object with the adjusted current focus, according to an actual distance between left and right lenses of the first binocular camera, and parallax of the first binocular camera.

9. The system of claim 8, wherein, the parallax of the first binocular camera is calculated based on a binocular matching principle.

10. The system of claim 8, wherein, the first binocular camera is further configured for:
  obtaining a current depth H of the target object according to the following equation:

$$H = \frac{L*f}{\Delta s},$$

wherein, L is the actual distance between the left and right lens of the first binocular camera, f is the current focus of the left and right lens of the first binocular camera, and $\Delta s$ is the parallax of the first binocular camera.

11. The system of claim 6, wherein, the image acquisition device is configured for:
  obtaining a large field-of-view image containing the target object, and determining a central point of the large field-of-view image;
  positioning a target area of interest within the large field-of-view image according to a preset area-of-interest positioning rule;
  determining a central point of the target area of interest according to the preset area-of- interest positioning rule; and
  calculating the horizontal movement angle and the vertical movement angle based on the central point of the target area-of-interest and the central point of the large field-of-view image.

12. The system of claim 11, wherein, the image acquisition device is configured for calculating the horizontal movement angle and the vertical movement angle according to the following equations:

$$\theta_x = \arctan\frac{\Delta x}{f},$$
$$\theta_y = \arctan\frac{\Delta y}{f};$$

wherein, $\Delta x$ is a projection distance in the horizontal direction of a line between the central point of the target area-of-interest and the central point of the large field-of-view image, $\Delta y$ is a projection distance in the vertical direction of a line between the central point of the target area of interest and the central point of the large field-of-view image.

13. The system of claim 6, wherein, the system further comprises:
a speckle projection device configured for forming randomly distributed speckles on the surface of the target object.

14. The system of claim 7, wherein, the system further comprises:
a speckle projection device configured for forming randomly distributed speckles on the surface of the target object.

15. The system of claim 8, wherein, the system further comprises:
a speckle projection device configured for forming randomly distributed speckles on the surface of the target object.

* * * * *